US012709341B2

(12) United States Patent
Nadeau et al.

(10) Patent No.: US 12,709,341 B2
(45) Date of Patent: Aug. 18, 2026

(54) TRACK SYSTEM FOR TRACTION OF A VEHICLE

(71) Applicant: CAMSO INC., Magog (CA)

(72) Inventors: Francois Nadeau, Sherbrooke (CA); Jean Turcotte, Sherbrooke (CA)

(73) Assignee: CAMSO INC., Magog (CA)

( * ) Notice: Subject to any disclaimer, the term of this patent is extended or adjusted under 35 U.S.C. 154(b) by 452 days.

(21) Appl. No.: 18/037,700

(22) PCT Filed: Nov. 22, 2021

(86) PCT No.: PCT/CA2021/051655

§ 371 (c)(1),
(2) Date: May 18, 2023

(87) PCT Pub. No.: WO2022/104481

PCT Pub. Date: May 27, 2022

(65) Prior Publication Data

US 2023/0406428 A1 Dec. 21, 2023

Related U.S. Application Data

(60) Provisional application No. 63/116,409, filed on Nov. 20, 2020.

(51) Int. Cl.

*B62D 55/30* (2006.01)
*B62D 55/14* (2006.01)

(Continued)

(52) U.S. Cl.

CPC ........... *B62D 55/305* (2013.01); *B62D 55/14* (2013.01); *B62D 55/244* (2013.01); *B62D 55/26* (2013.01); *B62D 55/06* (2013.01); *B62D 55/065* (2013.01)

(58) Field of Classification Search

CPC .... B62D 55/305; B62D 55/14; B62D 55/244; B62D 55/26

See application file for complete search history.

(56) References Cited

U.S. PATENT DOCUMENTS 1,868,148 A 7/1932 Mcmillan et al.
2,453,750 A * 11/1948 Kamlookhine ...... B62D 55/305 305/141

(Continued)

FOREIGN PATENT DOCUMENTS

CN 106494521 B 3/2019
DE 9006701 U1 10/1990

(Continued)

OTHER PUBLICATIONS

International Search Report dated Jan. 17, 2022.
EP 21893194 Supplementary European Search Reported dated Sep. 2, 2024.

*Primary Examiner* — Kip T Kotter

(74) *Attorney, Agent, or Firm* — Hahn Loeser & Parks LLP

(57) ABSTRACT

A track system for a vehicle on a ground, wherein the track system comprises a track and is designed to enhance how its track is tensioned, such as by including a plurality of tensioners that exert opposite forces on the track at its front and rear regions and/or lack hydraulic or pneumatic elements, allowing to reduce its dimensions (e.g., sizes of its components, "packaging" or envelope) and its weight, while protecting against ratcheting of the track, reducing its energy consumption, costs and/or maintenance requirements, increasing durability of the track, and/or improving other aspects of the track system and/or the vehicle.

18 Claims, 14 Drawing Sheets

(51) Int. Cl.

| | |
|---|---|
| ***B62D 55/24*** | (2006.01) |
| ***B62D 55/26*** | (2006.01) |
| *B62D 55/06* | (2006.01) |
| *B62D 55/065* | (2006.01) |

(56) References Cited

U.S. PATENT DOCUMENTS

| | | | | | |
|---|---|---|---|---|---|
| 3,841,424 | A * | 10/1974 | Purcell | B62D 55/1086 | 180/9.5 |
| 3,938,606 | A * | 2/1976 | Yancey | B62D 55/02 | 180/9.5 |
| 4,386,809 | A | 6/1983 | Lapsys | | |
| 7,597,161 | B2 * | 10/2009 | Brazier | B62D 55/108 | 180/9.26 |
| 2005/0127752 | A1 * | 6/2005 | Spector | A61G 5/066 | 305/126 |
| 2009/0273233 | A1 | 11/2009 | Tokach et al. | | |
| 2012/0242142 | A1 | 9/2012 | Kautsch et al. | | |
| 2014/0103705 | A1 * | 4/2014 | Delisle | B62D 55/244 | 305/178 |
| 2015/0129329 | A1 | 5/2015 | Cox | | |
| 2019/0071140 | A1 | 3/2019 | Buchanan | | |

FOREIGN PATENT DOCUMENTS

| | | | |
|---|---|---|---|
| GB | 2393696 | A | 4/2004 |
| KR | 100780810 | B1 | 11/2007 |
| WO | 2019185195 | A1 | 3/2019 |

* cited by examiner

TRACK SYSTEM FOR TRACTION OF A VEHICLE

CROSS-REFERENCE TO RELATED APPLICATIONS

This application claims priority to, and the benefit of, U.S. provisional patent application No. 63/116,409, filed Nov. 20, 2021 with the U.S. Patent and Trademark Office, which is hereby incorporated by reference.

FIELD

This disclosure relates generally to vehicles (e.g., agricultural vehicles or other industrial vehicles, etc.) and, more particularly, to track systems for traction of vehicles.

BACKGROUND

Off-road vehicles, including agricultural vehicles (e.g., tractors, harvesters, combines, etc.), construction vehicles (e.g., loaders, excavators, bulldozers, etc.), and forestry vehicles (e.g., feller-bunchers, knuckleboom loaders, etc.), military vehicles (e.g., combat engineering vehicles (CEVs), etc.), snowmobiles, and all-terrain vehicles (ATVs), may comprise track systems to enhance their traction and floatation on soft, slippery, and/or irregular grounds (e.g., soil, mud, etc.).

A vehicle's track system comprises a track-engaging assembly and a track that is driven around the track-engaging assembly, which may include a frame, track-contacting wheels, etc. For instance, the track-engaging assembly may include a drive wheel, which can include a sprocket, and the track may comprise drive lugs. The track-engaging assembly typically includes a tensioning mechanism to maintain the track under tension. For instance, the tensioning mechanism may include a hydraulic tensioner for tensioning the track.

During use, track systems are sometimes subject to "ratcheting" of their track, i.e., their drive wheel slipping over drive lugs of their track.

To diminish the occurrence of ratcheting, nominal track tension may be increased, but this may negatively affect the performances and durability of the track system.

Increasing nominal track tension also requires heavier, bulkier hydraulic tensioners which also negatively affect the performances, cost, durability and packageability of the track system.

For these and other reasons, improvements for track systems of vehicles would be welcomed.

SUMMARY

According to various aspects, this disclosure relates to a track system for a vehicle on a ground, wherein the track system comprises a track and is designed to enhance how its track is tensioned, such as by including a plurality of tensioners that exert opposite forces on the track at its front and rear regions and/or lack hydraulic or pneumatic elements, allowing to reduce its dimensions (e.g., sizes of its components, "packaging" or envelope) and its weight, while protecting against ratcheting of the track, reducing its energy consumption, costs and/or maintenance requirements, increasing durability of the track, and/or improving other aspects of the track system and/or the vehicle.

For example, according to an aspect, this disclosure relates to a track system for traction of a vehicle on a ground. The track system comprises: a track that is elastomeric and comprises a ground-engaging outer surface for engaging the ground and an inner surface opposite to the ground-engaging outer surface; a plurality of track-contacting wheels configured to drive and guide the track around the track-contacting wheels, the track being configured to flex about respective ones of the track-contacting wheels; and a tensioning mechanism configured to control a tension of the track. The tensioning mechanism comprises: a first tensioner including a resilient element configured to exert a force on a front one of the track-contacting wheels; and a second tensioner including a resilient element spaced from the resilient element of the first tensioner in a longitudinal direction of the track system and configured to exert a force on a rear one of the track-contacting wheels.

According to another aspect, this disclosure relates to a track system for traction of a vehicle on a ground. The track system comprises: track that is elastomeric and comprises a ground-engaging outer surface for engaging the ground and an inner surface opposite to the ground-engaging outer surface; a plurality of track-contacting wheels configured to drive and guide the track around the track-contacting wheels, the track being configured to flex about respective ones of the track-contacting wheels; and a tensioning mechanism configured to control a tension of the track. The tensioning mechanism comprises: a first tensioner including a spring configured to exert a force on a front one of the track-contacting wheels; and a second tensioner including a spring spaced from the spring of the first tensioner in a longitudinal direction of the track system and configured to exert a force on a rear one of the track-contacting wheels.

According to another aspect, this disclosure relates to a track system for traction of a vehicle on a ground. The track system comprises: a track that is elastomeric and comprises a ground-engaging outer surface for engaging the ground and an inner surface opposite to the ground-engaging outer surface; a plurality of track-contacting wheels configured to drive and guide the track around the track-contacting wheels, the track being configured to flex about respective ones of the track-contacting wheels; and a tensioning mechanism configured to control a tension of the track and exert forces in opposite directions on front and rear ones of the track-contacting wheels.

According to another aspect, this disclosure relates to a track system for traction of a vehicle on a ground. The track system comprises: a track that is elastomeric and comprises a ground-engaging outer surface for engaging the ground and an inner surface opposite to the ground-engaging outer surface; a plurality of track-contacting wheels configured to drive and guide the track around the track-contacting wheels, the track being configured to flex about respective ones of the track-contacting wheels; and a tensioning mechanism configured to control a tension of the track and prevent ratcheting of the track in forward and reverse directions of movement of the vehicle on the ground.

According to another aspect, this disclosure relates to a track system for traction of a vehicle on a ground. The track system comprises: a track that is elastomeric and comprises a ground-engaging outer surface for engaging the ground and an inner surface opposite to the ground-engaging outer surface; a plurality of track-contacting wheels configured to drive and guide the track around the track-contacting wheels, the track being configured to flex about respective ones of the track-contacting wheels; and a tensioning mechanism configured to control a tension of the track. The tensioning mechanism comprises: a first tensioner including a resilient element configured to exert a force on a front one of the track-contacting wheels; and a second tensioner including a resilient element spaced from the resilient element of the first tensioner in a longitudinal direction of the track system and configured to exert a force on a rear one of the track-contacting wheels. Each of the first tensioner and the second tensioner is free of hydraulics and pneumatics.

These and other aspects of this disclosure will now become apparent to those of ordinary skill in the art upon review of a description of embodiments in conjunction with accompanying drawings.

BRIEF DESCRIPTION OF DRAWINGS

A detailed description of embodiments is provided below, by way of example only, with reference to the accompanying drawings, in which.

It is to be expressly understood that the description and drawings are only for purposed of illustrating certain embodiments and are an aid for understanding. They are not intended to be and should not be limiting.

DETAILED DESCRIPTION OF EMBODIMENTS

Figure 1:
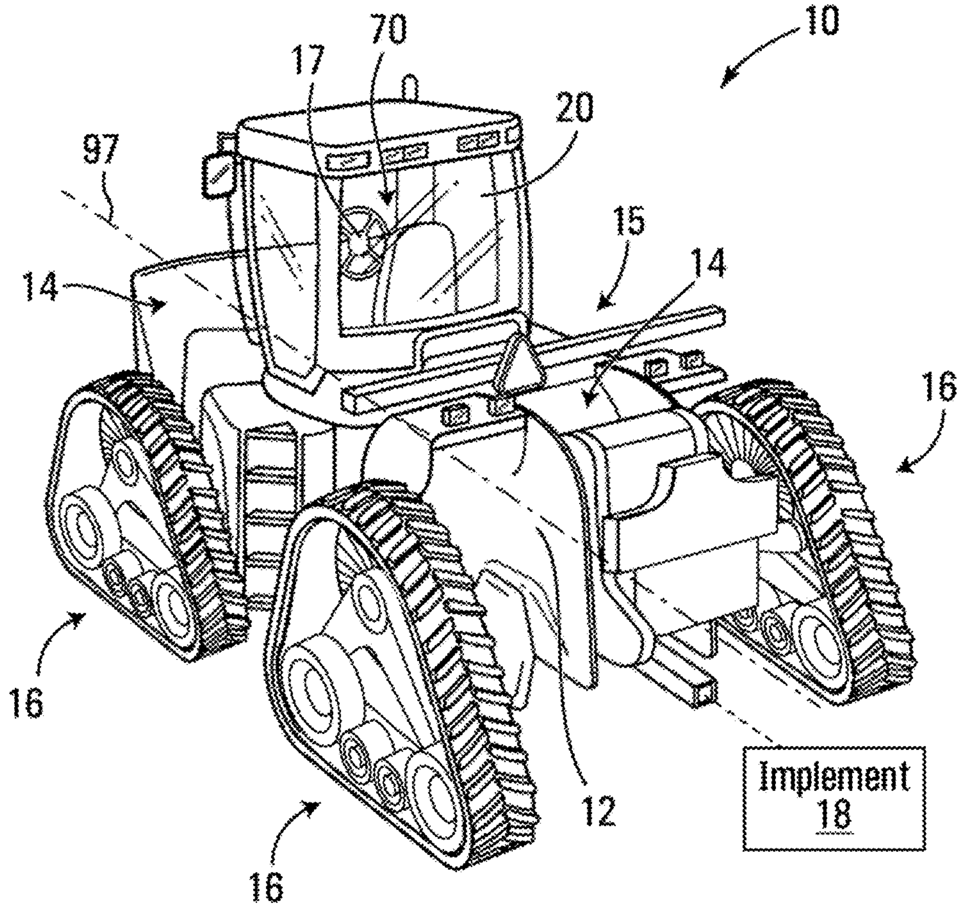
FIG. 1 shows an example of an agricultural vehicle comprising a track system in accordance with an embodiment.

FIG. 1 shows an embodiment of a vehicle 10 comprising track systems 16 including tracks 22 for traction of the vehicle 10 on a ground. In this embodiment, the vehicle 10 is an agricultural vehicle for performing agricultural work on an agricultural field including soil. Specifically, in this example, the agricultural vehicle 10 is a tractor. In other examples, the agricultural vehicle 10 may be a combine harvester, another type of harvester, or any other type of agricultural vehicle.

The agricultural vehicle 10 comprises a frame 12, a powertrain 15, a steering system 17, the track systems 16 (which can be referred to as "undercarriages"), and an operator cabin 20 that enable an operator to move the agricultural vehicle 10 on the ground. The vehicle 10 can travel on the agricultural field to perform agricultural work using a work implement 18. The vehicle 10 can also be "roading", i.e., travelling on a road (i.e., a paved road having a hard surface of asphalt, concrete, gravel, or other pavement), such as between agricultural fields.

As further discussed later, in this embodiment, the track systems 16 are designed to enhance how their tracks 22 are tensioned, such as by including a plurality of tensioning units that exert opposite forces on their tracks 22 at their front and rear regions and/or lack heavy or bulky hydraulic or pneumatic elements, allowing to reduce their dimensions (e.g., sizes of their components, "packaging" or envelope) and their weight, while protecting against ratcheting of their track 22, reducing their energy consumption, costs and/or maintenance requirements, increasing durability of their track 22, and/or improving other aspects of the track systems 16 and/or the vehicle 10.

The powertrain 15 is configured for generating motive power and transmitting motive power to the track systems 16 to propel the agricultural vehicle 10 on the ground. To that end, the powertrain 15 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with the track systems 16. That is, the powertrain 15 transmits motive power generated by the prime mover 14 to one or more of the track systems 16 in order to drive (i.e., impart motion to) these one or more of the track systems 16. The powertrain 15 may transmit power from the prime mover 14 to the track systems 16 in any suitable way. In this embodiment, the powertrain 15 comprises a transmission between the prime mover 14 and final drive axles 56 for transmitting motive power from the prime mover 14 to the track systems 16. The transmission may be an automatic transmission (e.g., a continuously variable transmission (CVT)) or any other suitable type of transmission.

The work implement 18 is used to perform agricultural work. For example, in some embodiments, the work implement 18 may be a combine head, a cutter, a scraper pan, a tool bar, a planter, or any other type of agricultural work implement.

The operator cabin 20 is where the operator sits and controls the agricultural vehicle 10. More particularly, the operator cabin 20 comprises a user interface 70 including a set of controls that allow the operator to steer the agricultural vehicle 10 on the ground and operate the work implement 18. For example, in this embodiment, the user interface 70 comprises an accelerator, a brake control, and a steering device that are operable by the operator to control motion of the agricultural vehicle 10 on the ground and operation of the work implement 18. The user interface 70 also comprises an instrument panel (e.g., a dashboard) which provides indicators (e.g., a speedometer indicator, a tachometer indicator, etc.) to convey information to the operator.

Figure 2:
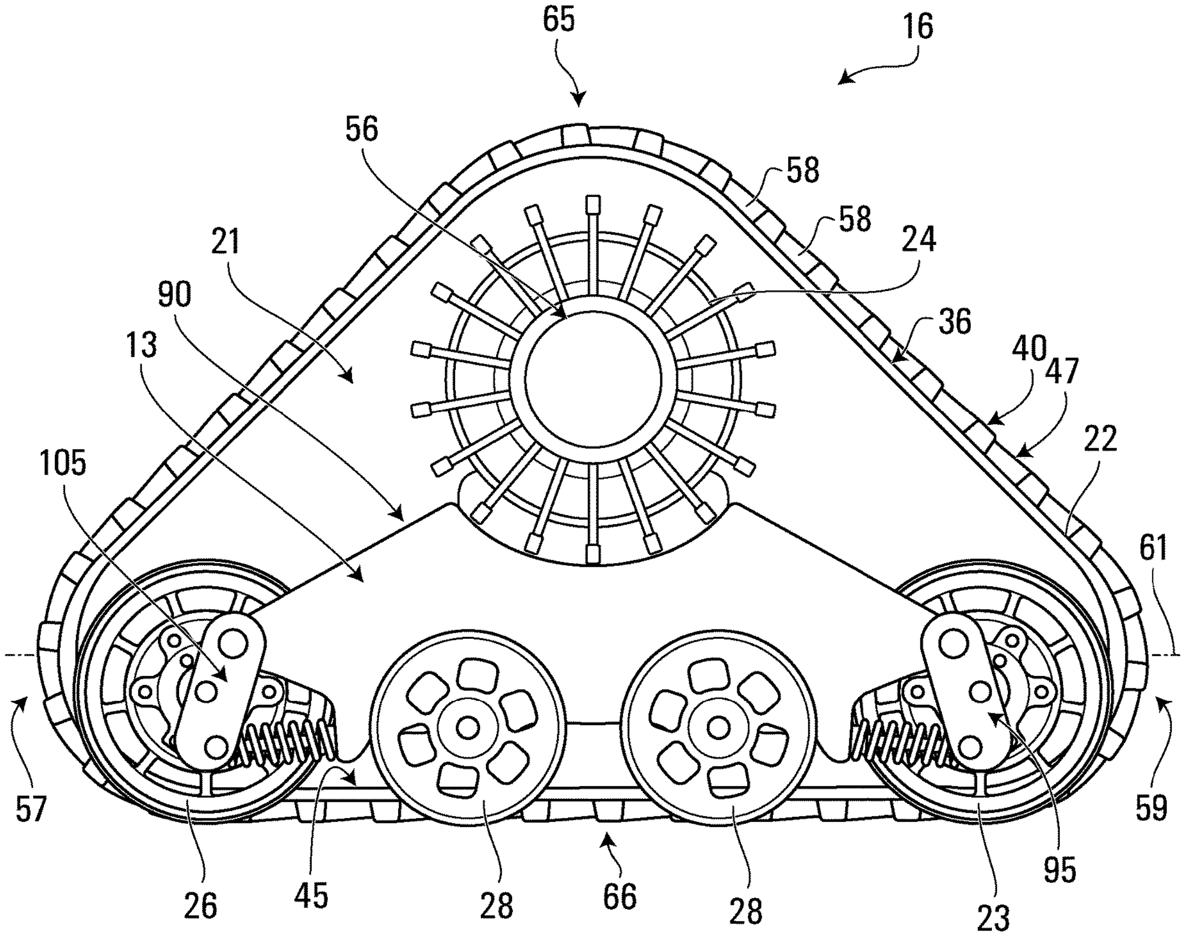
FIG. 2 shows a perspective view and a side view of the track system.
Figure 4:
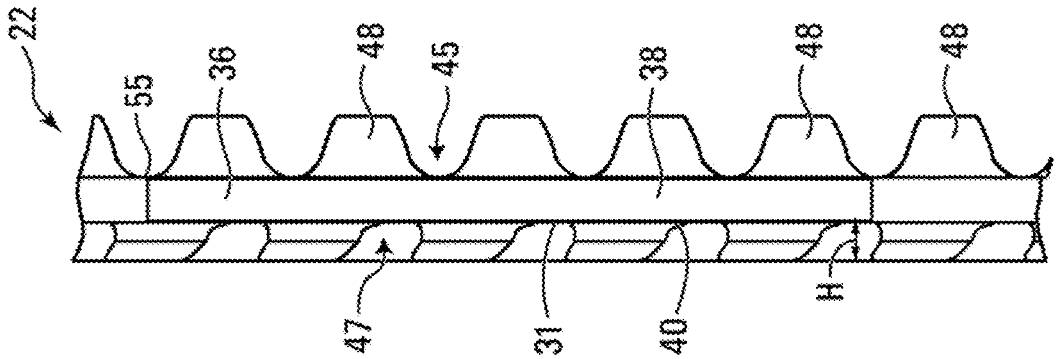
FIGS. 3 and 4 show a plan view and a side view of a track of the track system.
Figure 3:
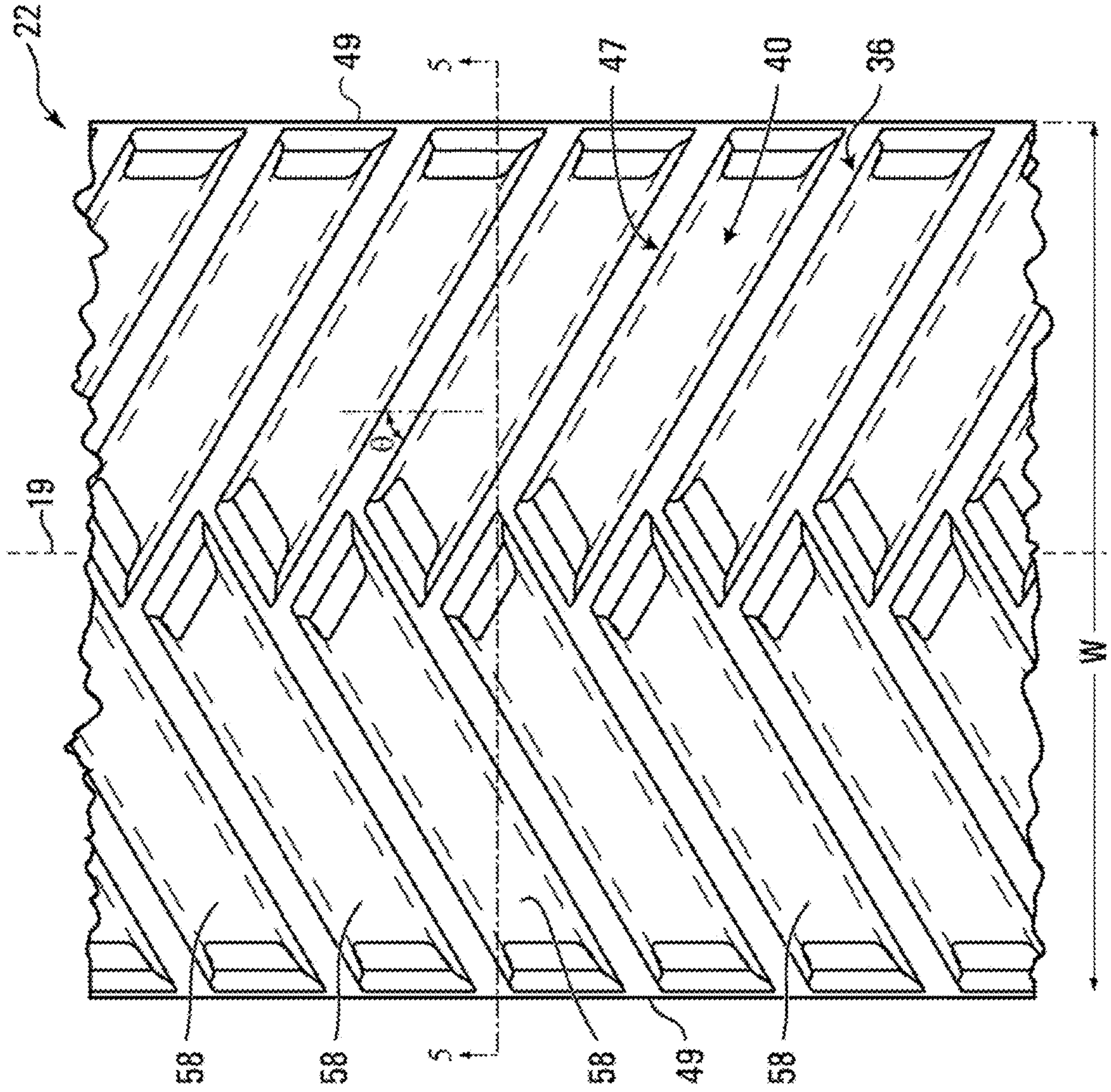
Figure 5:
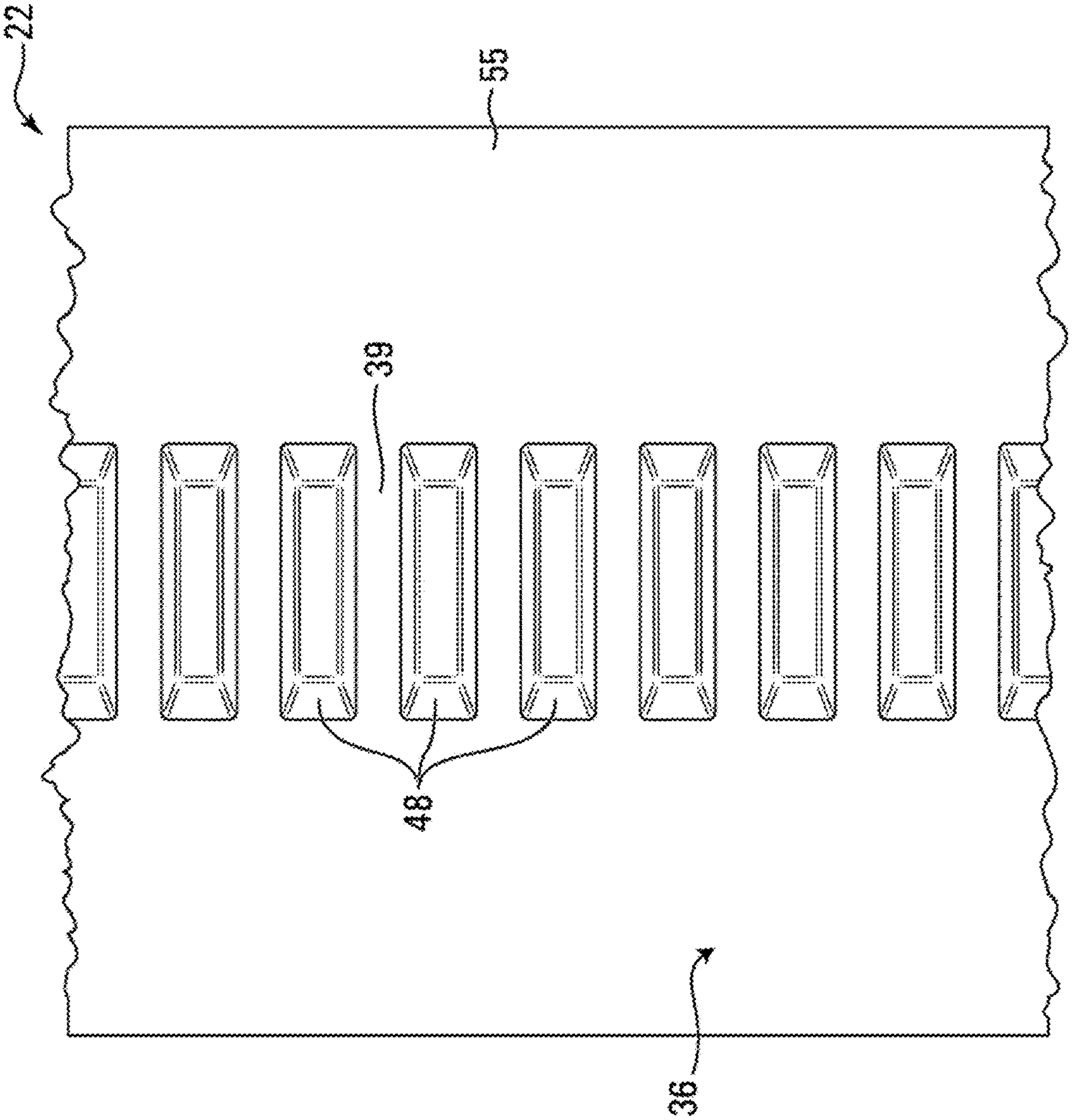
FIG. 5 shows an inside view of the track.
Figure 6:
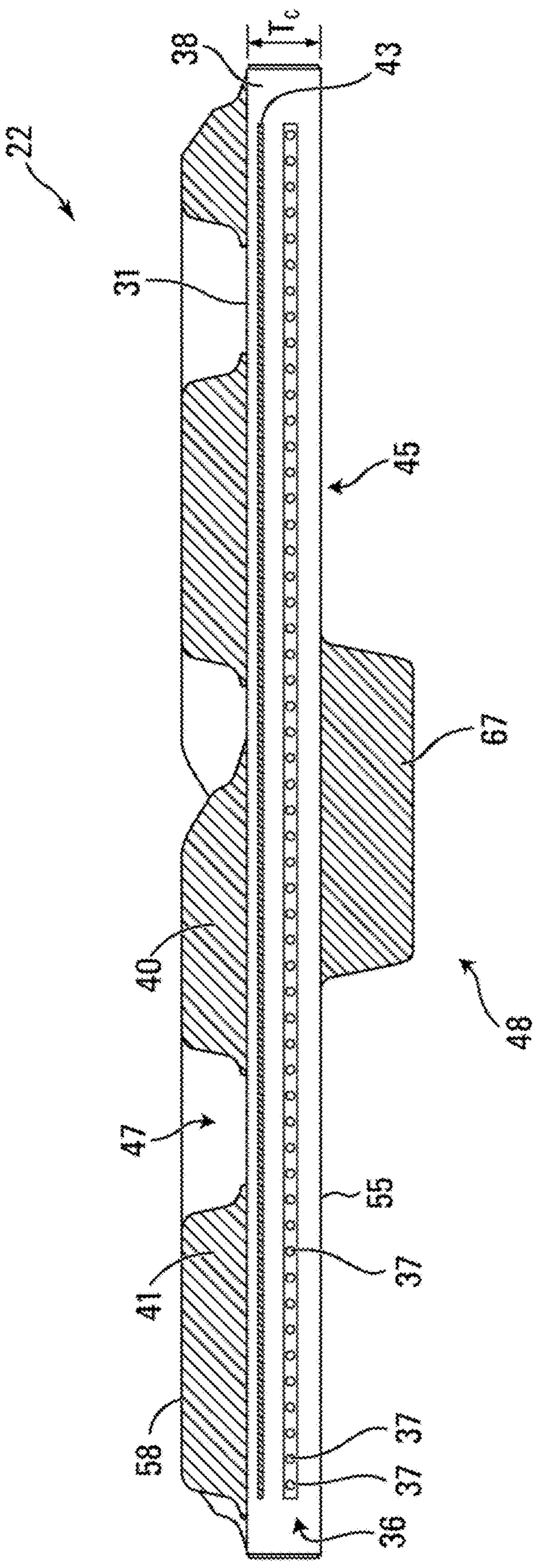
FIG. 6 shows a cross-sectional view of the track.
Figure 7:
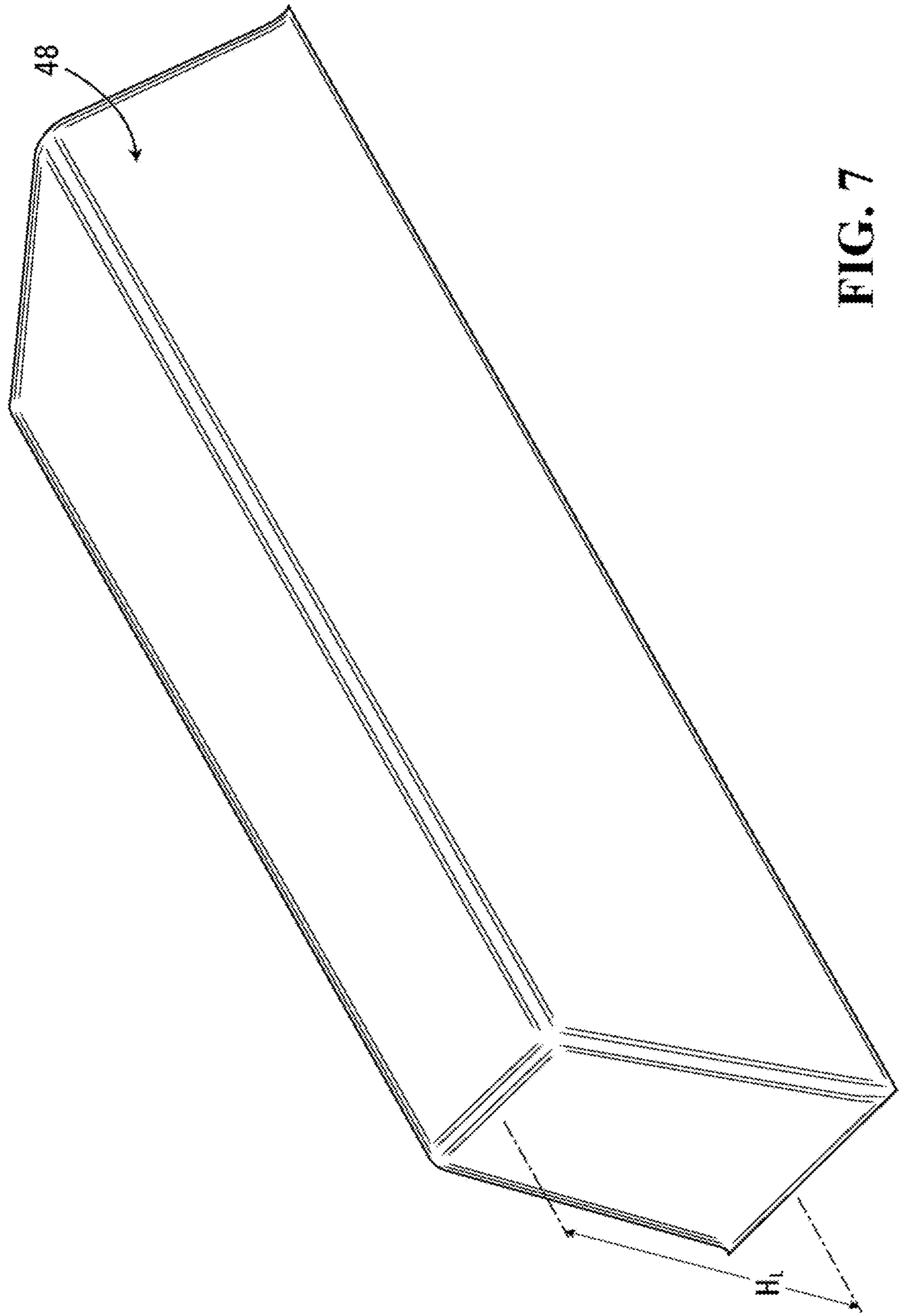
FIG. 7 shows a perspective view of a drive/guide projection of the track.
Figure 8:
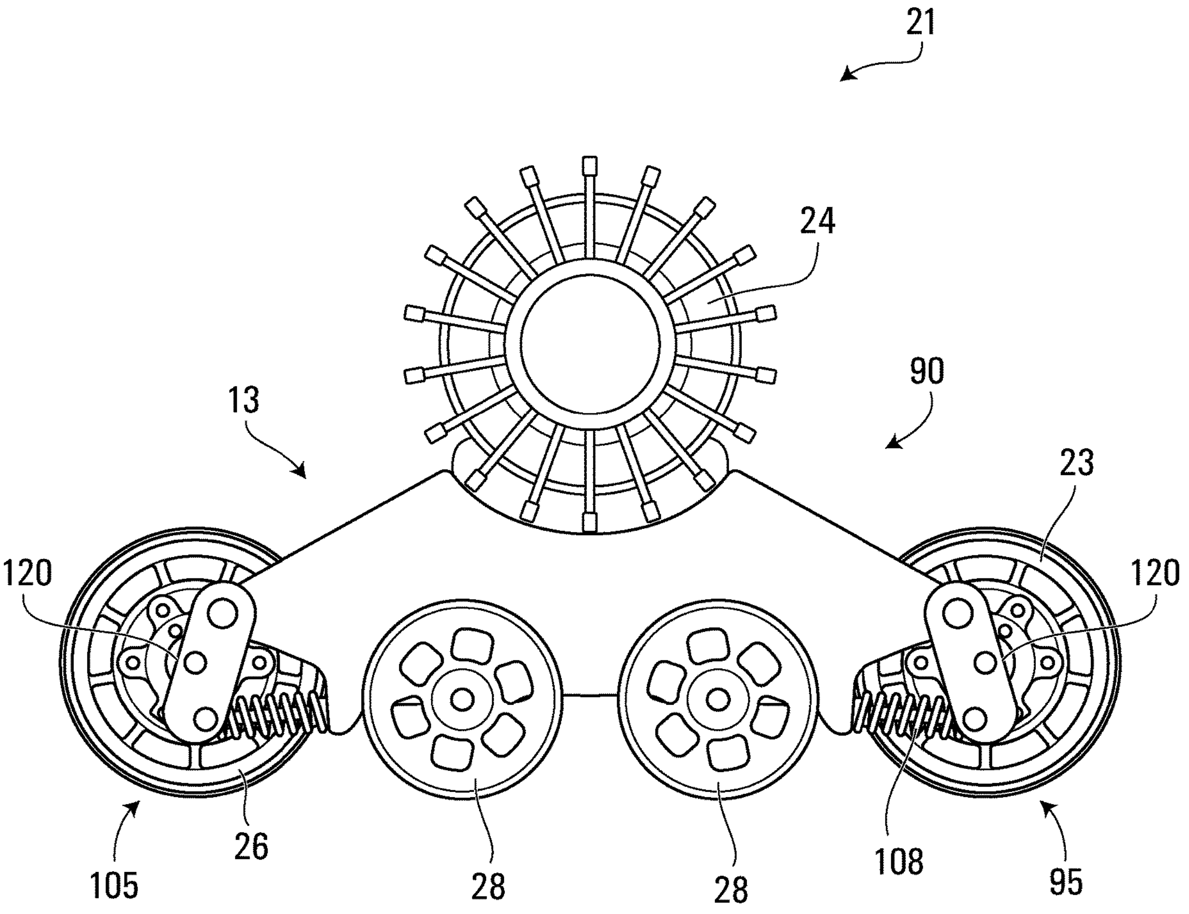
FIG. 8 shows a track-engaging assembly of the track system.

The track systems 16 engage the ground to propel the agricultural vehicle 10. As shown in FIG. 2, each track system 16 comprises a track-engaging assembly 21 and a track 22 disposed around the track-engaging assembly 21. In this embodiment, the track-engaging assembly 21 comprises a plurality of track-contacting wheels which, in this example, includes a drive wheel 24 and a plurality of idler wheels that includes front (i.e., leading) idler wheels 23, rear (i.e., trailing) idler wheels 26, and roller wheels 28. The track-engaging assembly 21 also comprises a frame 13 which supports various components of the track system 16, including the wheels 23, 26, 28. The track system 16 has a longitudinal direction and a first longitudinal end 57 and a second longitudinal end 59 that define a length of the track system 16 along a longitudinal axis 61 that defines the longitudinal direction of the track system 16. The track system 16 has a widthwise direction and a width that is defined by a width W of the track 22. The track system 16 also has a heightwise direction that is normal to its longitudinal direction and its widthwise direction.

In this embodiment, front ones of the track systems 16 are steerable by the steering system 17 of the agricultural vehicle 10 in response to input of the user at the steering device to change an orientation of each of these track systems relative to the frame 12 of the agricultural vehicle 10 in order to steer the agricultural vehicle 10 on the ground. To that end, each of the front ones of the track systems 16 is pivotable about a steering axis 25 of the agricultural vehicle 10. An orientation of the longitudinal axis 61 of each of the front ones of the track systems 16 is thus adjustable relative to a longitudinal axis 97 of the agricultural vehicle 10.

The track 22 engages the ground to provide traction to the agricultural vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 3 to 7, the track 22 comprises an inner side 45, a ground-engaging outer side 47, and lateral edges 49. The inner side 45 faces the wheels 23, 24, 26, 28, while the ground-engaging outer side 47 engages the ground. A top run 65 of the track 22 extends between the longitudinal ends 57, 59 of the track system 16 and over the wheels 23, 24, 26, 28, while a bottom run 66 of the track 22 extends between the longitudinal ends 57, 59 of the track system 16 and under the wheels 23, 24, 26, 28. The bottom run 66 of the track 22 defines an area of contact 63 of the track 22 with the ground which generates traction and bears a majority of a load on the track system 16, and which will be referred to as a "contact patch" of the track 22 with the ground. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thickness direction normal to its longitudinal and widthwise directions.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an endless body 36 underlying its inner side and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21.

In this embodiment, the carcass 36 comprises a plurality of reinforcements embedded in its elastomeric material 38. These reinforcements can take on various forms.

For example, in this embodiment, the carcass 36 comprises a layer of reinforcing cables 37 that are adjacent to one another and extend generally in the longitudinal direction of the track 22 to enhance strength in tension of the track 22 along its longitudinal direction. In this case, each of the reinforcing cables 37 is a cord including a plurality of strands (e.g., textile fibers or metallic wires). In other cases, each of the reinforcing cables 37 may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the reinforcing cables 37 and the layer of reinforcing fabric 43.

The inner side 45 of the track 22 comprises an inner surface 55 of the carcass 36 and a plurality of wheel-contacting projections 48 that project from the inner surface 55 and are positioned to contact at least some of the wheels 23, 24, 26, 28 to do at least one of driving (i.e., imparting motion to) the track 22 and guiding the track 22. The wheel-contacting projections 48 can be referred to as "wheel-contacting lugs". Furthermore, since each of them is used to do at least one of driving the track 22 and guiding the track 22, the wheel-contacting lugs 48 can be referred to as "drive/guide projections" or "drive/guide lugs". In some examples of implementation, a drive/guide lug 48 may interact with the drive wheel 24 to drive the track 22, in which case the drive/guide lug 48 is a drive lug. In other examples of implementation, a drive/guide lug 48 may interact with the front and rear idler wheels 23, 26 and/or the roller wheels 28 to guide the track 22 to maintain proper track alignment and prevent de-tracking without being used to drive the track 22, in which case the drive/guide lug 48 is a guide lug. In yet other examples of implementation, a drive/guide lug 48 may both (i) interact with the drive wheel 24 to drive the track and (ii) interact with the idler wheels 23, 26 and/or the roller wheels 28 to guide the track 22 to maintain proper track alignment and prevent de-tracking, in which case the drive/guide lug 48 is both a drive lug and a guide lug.

In this embodiment, the drive/guide lugs 48 interact with the drive wheel 24 in order to cause the track 22 to be driven, and also interact with the idler wheels 23, 26 and the roller wheels 28 in order to guide the track 22 as it is driven by the drive wheel 24 to maintain proper track alignment and prevent de-tracking. The drive/guide lugs 48 are thus used to both drive the track 22 and guide the track 22 in this embodiment.

In this example of implementation, the drive/guide lugs 48 are arranged in a single row disposed longitudinally along the inner side 45 of the track 22. The drive/guide lugs 48 may be arranged in other manners in other examples of implementation (e.g., in a plurality of rows that are spaced apart along the widthwise direction of the track 22).

In this embodiment, the drive/guide lugs 48 are configured to pass between respective pairs of the idler wheels 23, 26 and/or the roller wheels 28 when they are aligned with one another, such that lateral surfaces of each drive/guide lug 48 face respecting ones of the idler wheels 23, 26 and/or the roller wheels 28 when they are aligned with one another.

In this embodiment, each drive/guide lug 48 is an elastomeric drive/guide lug in that it comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide lug 48. In other embodiments, the elastomeric material 67 may include another elastomer in addition to or instead of rubber (e.g., polyurethane elastomer). The drive/guide lugs 48 may be provided on the inner side 45 in various ways. For example, in this embodiment, the drive/guide lugs 48 are provided on the inner side by being molded with the carcass 36.

The ground-engaging outer side 47 comprises a ground-engaging outer surface 31 of the carcass 36 and a tread pattern 40 to enhance traction on the ground. The tread pattern 40 comprises a plurality of traction projections 58 projecting from the ground-engaging outer surface 31, spaced apart in the longitudinal direction of the track 22, and engaging the ground to enhance traction. The traction projections 58 may be referred to as "tread projections" or "traction lugs".

The traction lugs 58 may have any suitable shape. In this embodiment, each of the traction lugs 58 has an elongated shape and is angled, i.e., defines an oblique angle θ (i.e., an angle that is not a right angle or a multiple of a right angle), relative to the longitudinal direction of the track 22. The traction lugs 58 may have various other shapes in other examples (e.g., curved shapes, shapes with straight parts and curved parts, etc.).

In this embodiment, each traction lug 58 is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug 58. In other embodiments, the elastomeric material 41 may include another elastomer in addition to or instead of rubber (e.g., polyurethane elastomer). The traction lugs 58 may be provided on the ground-engaging outer side 47 in various ways. For example, in this embodiment, the traction lugs 58 are provided on the ground-engaging outer side 47 by being molded with the carcass 36.

The track 22 may be constructed in various other manners in other embodiments. For example, in some embodiments, the track 22 may have recesses or holes that interact with the drive wheel 24 in order to cause the track 22 to be driven (e.g., in which case the drive/guide lugs 48 may be used only to guide the track 22 without being used to drive the track 22, i.e., they may be "guide lugs" only), and/or the ground-engaging outer side 47 of the track 22 may comprise various patterns of traction lugs.

The drive wheel 24 is rotatable by power derived from the prime mover 14 to drive the track 22. That is, power generated by the prime mover 14 and delivered over the powertrain 15 of the agricultural vehicle 10 can rotate a final drive axle 56, which causes rotation of the drive wheel 24, which in turn imparts motion to the track 22.

Figure 9:
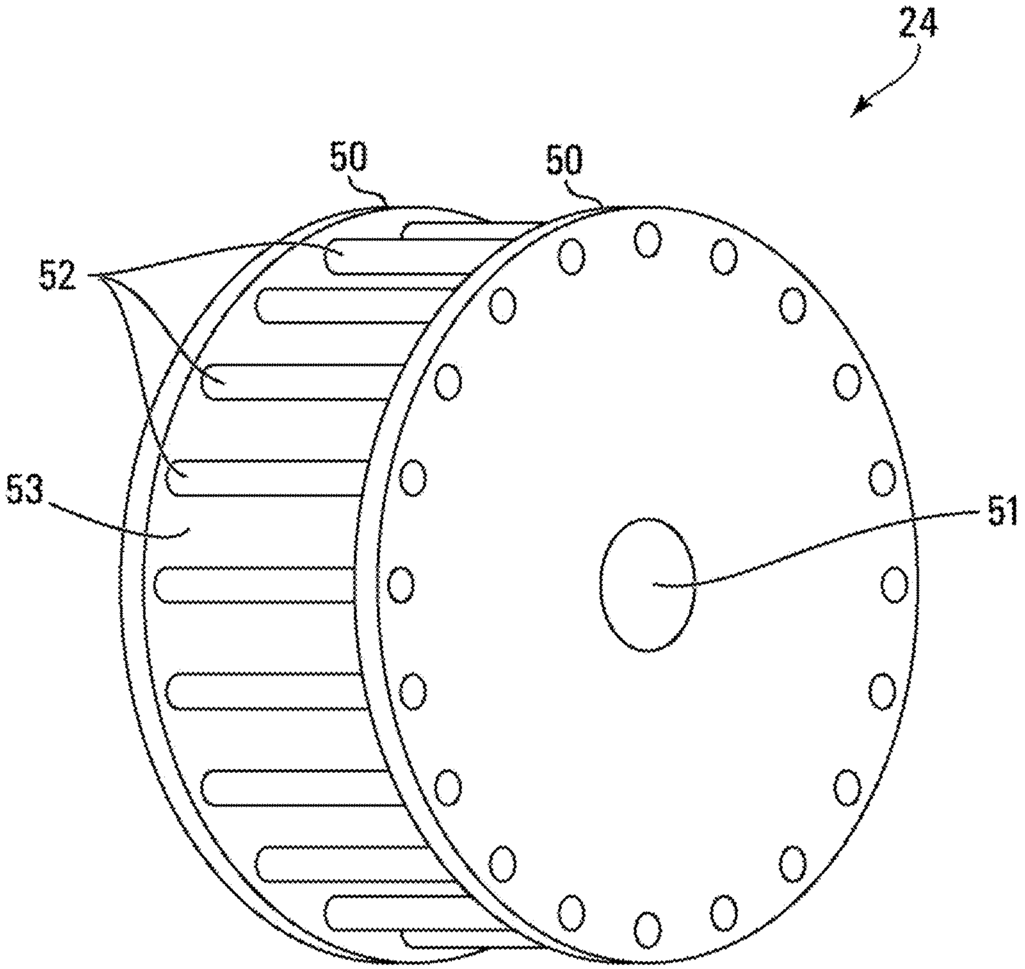
FIG. 9 shows a drive wheel of the track-engaging assembly.

With additional reference to FIG. 9, in this embodiment, the drive wheel 24 comprises a drive sprocket comprising a plurality of drive members 52 spaced apart along a circular path to engage the drive/guide lugs 48 of the track 22 in order to drive the track 22. The drive wheel 24 and the track 22 thus implement a "positive drive" arrangement. More particularly, in this embodiment, the drive wheel 24 comprises two side discs 50 which are co-centric and turn about a common axle 51 and between which the drive members 52 extend near respective peripheries of the side discs 50. In this example, the drive members 52 are thus drive bars that extend between the side discs 50. The drive wheel 24 and the track 22 have respective dimensions allowing interlocking of the drive bars 52 of the drive wheel 24 and the drive/guide lugs 48 of the track 22. Adjacent ones of the drive bars 52 define an interior space 53 between them to receive one of the drive/guide lugs 48. Adjacent ones of the drive/guide lugs 48 define an inter-lug space 39 between them to receive one of the drive bars 52. The drive/guide lugs 48 and the drive bars 52 have a regular spacing that allows interlocking of the drive/guide lugs 48 and the drive bars 52 over a certain length of the drive wheel's circumference.

The drive wheel 24 may be configured in various other ways in other embodiments. For example, in other embodiments, the drive wheel 24 may not have any side discs such as the side discs 50. As another example, in other embodiments, instead of being drive bars, the drive members 52 may be drive teeth that are distributed circumferentially along the drive wheel 24 or any other type of drive members. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" arrangement).

Figure 10:
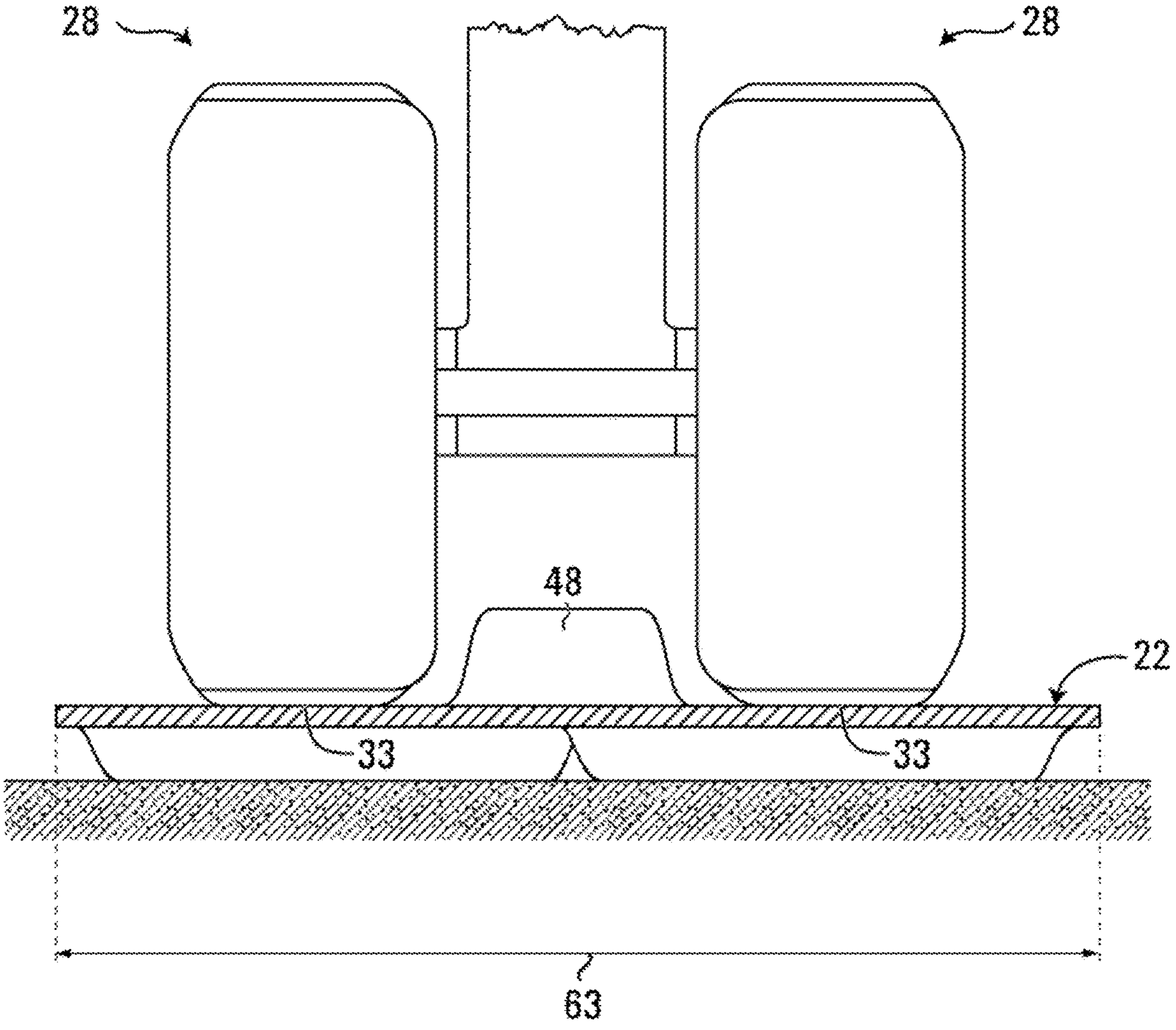
FIG. 10 shows mid-rollers of the track-engaging assembly engaging an inner side the track.

The front idler, rear idler, and roller wheels 23, 26, 28 are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22. More particularly, in this embodiment, the front and rear idler wheels 23, 26 maintain the track 22 in tension and help to support part of the weight of the agricultural vehicle 10 on the ground via the track 22. In this embodiment, each of the front and rear idler wheels 23, 26 has an axle 125. As shown in FIG. 10, the roller wheels 28 roll on a rolling path 33 of the inner side 45 of the track 22 along the bottom run 66 of the track 22 to apply the bottom run 66 on the ground. In this case, as they are located between frontmost and rearmost ones of the wheels of the track system 16, the roller wheels 28 can be referred to as "mid-rollers".

In this embodiment, each of the front idler, rear idler, and roller wheels 23, 26, 28 may engage a significant extent of the width W of the track 22. For example, in some embodiments, a ratio of a width of a given one of the front idler, rear idler, and roller wheels 23, 26, 28 over the width W of the track 22 may be at least 0.2, in some cases at least 0.3, in some cases at least 0.4, and in some cases even more.

In this embodiment, the track system 16 comprises a tensioning mechanism 90 configured to control a tension of the track 22. More specifically, in this embodiment, the tensioning mechanism 90 is configured to prevent ratcheting of the track 22 in forward and reverse directions of movement of the vehicle 10 on the ground, and is configured to exert forces in opposite directions on the idler wheels 23, 26.

The tensioning mechanism 90 comprises a plurality of tensioners configured to exert a plurality of forces in different directions on one or more of the wheels 23, 26, 28. More specifically, in this embodiment, the tensioning mechanism 90 comprises a front tensioner 95 configured to exert a force on the front idler wheel 23 and a rear tensioner 105 spaced from the front tensioner 95 in the longitudinal direction of the track system 16 configured to exert a force on the rear idler wheel 26. In this embodiment, the force exerted by the front tensioner 95 on the front idler wheel 23 and the force exerted by the rear tensioner 105 on the rear idler wheel 26 are applied in opposite directions.

Each of the tensioners 95, 105 comprises a resilient element 108 configured to exert a force on a wheel. The resilient element 108 is configured to resiliently change (e.g., deform) from a first configuration (e.g., a first shape) to a second configuration (e.g., a second shape) under stress and recover its first configuration when the stress ceases. In particular, the resilient element 108 of the front tensioner 95 is configured to exert a force on the front idler wheel 23 and the resilient element 108 of the rear tensioner 105 is spaced from the resilient element 108 of the front tensioner 95 in the longitudinal direction of the track system 16 and is configured to exert a force on the rear idler wheel 26.

Figure 11:
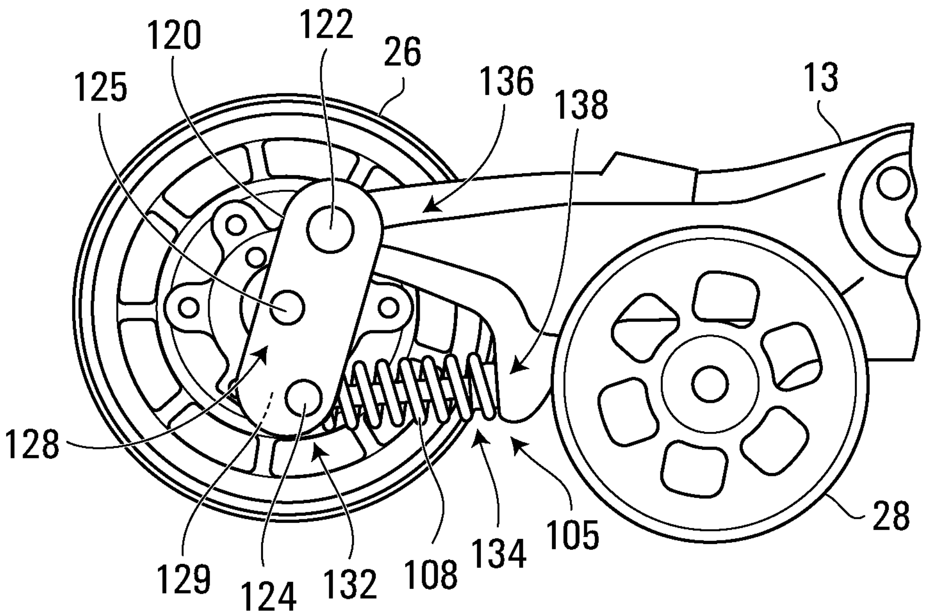
FIG. 11 shows a portion of the track-engaging assembly comprising a tensioner.
Figure 12:
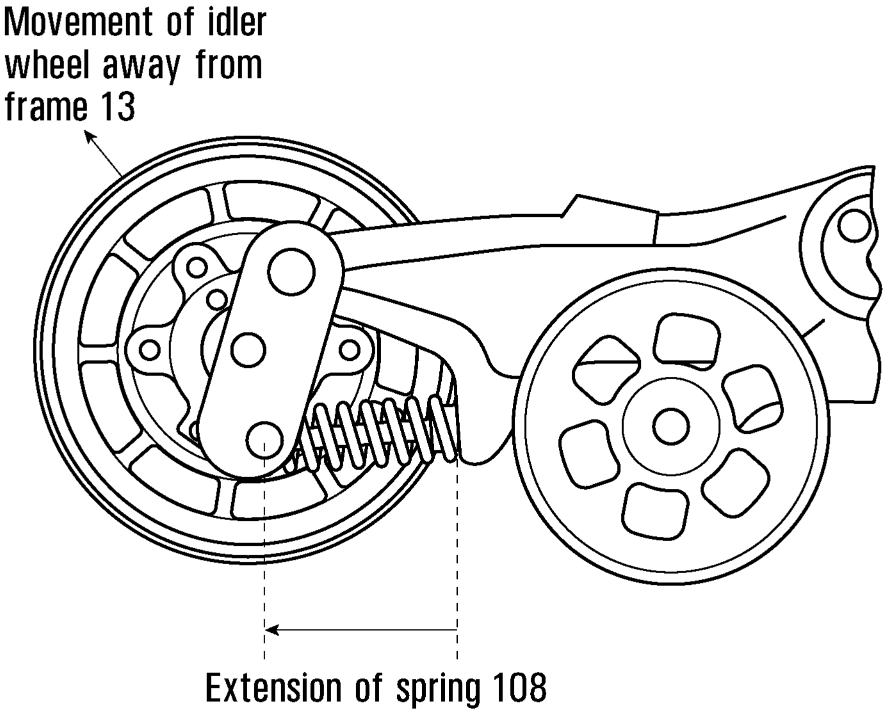
FIG. 12 shows an effect of extension of a resilient element of the tensioner of FIG. 11 on the portion of the track-engaging assembly.

In this embodiment, as shown in FIGS. 11 and 12, the tensioner 95 comprises a link 120 connecting the axle 125 of the front idler wheel 23 to the frame 13 of the track-engaging assembly 21. In particular, the link 120 may comprise an upper pivot 122 rotatably connected to an upper portion 136 of the frame 13, a lower pivot 124 rotatably connected to a first end 132 of the resilient element 108, and a housing 128 for receiving the axle 125 of the front idler wheel 23. In this embodiment, a second end 134 of the resilient element 108 opposite the first end 132 is connected to a lower portion 138 of the frame 13, and the housing 128 is between the upper and lower pivots 122, 124 such that an extension of the resilient element 108 pushes the axle 125 of the front idler wheel 23 away from the frame 13, and inversely a compression of the resilient element 108 pulls the axle 125 of the front idler wheel 23 towards the frame 13. In other embodiments, the link 120 may be free of a lower pivot 124 and may instead comprise an attachment point affixed to one end of the resilient element, In this embodiment, the tensioners 95, 105 are free of (i.e., without) hydraulics and pneumatics, and more generally the tensioning mechanism 90 may be free of hydraulics and pneumatics. This may allow to reduce weight, reduce costs, reduce maintenance requirements and/or enhance durability of the tensioning mechanism 90 and, more generally, of the track system 16.

More specifically, in this embodiment, the resilient element 108 of each one of the tensioners 95, 105 is a spring, and the link 120 comprises a spring seat 129 adjacent the lower pivot 124. The spring 108 may be configured be in compression when the track system 16 is at rest. More specifically, the spring 108 of each one of the tensioners 95, 105 may be a coil spring.

In this embodiment, the configuration of the tensioning mechanism 90 with the tensioners 95, 105 allows reducing a nominal value of the tension of the track 22 and reducing a spring rate of the springs 108 while still preventing ratcheting.

As another example, without being bound by theory, in some embodiments, the force exerted by the tensioners of the track system 16 may depend on the acceleration of the vehicle 10. For instance, when the vehicle 10 accelerates in a forward direction, the front tensioner may be less compressed and may apply a lesser force on the track 22, while the rear tensioner may be more compressed and may apply a greater force on the track 22, and inversely when the vehicle 10 accelerates in a rearward direction (e.g. during braking), the front tensioner may be more compressed and may apply a greater force on the track 22, while the rear tensioner may be less compressed and may apply a lesser force on the track 22. In this example, to maintain a tension in the track 22 at the drive wheel 24 that is sufficient to prevent ratcheting in any situation (i.e., accelerating or braking in any direction), a single-tensioner track system would require a spring rate of the tensioner and a nominal value of the track tension that are relatively high. In this embodiment, the pair of tensioners 95, 105 allows reducing the variation of the tension of the track 22 along its length and allows maintaining a tension in the track 22 at the drive wheel 24 that is sufficient to prevent ratcheting with relatively low nominal value of the tension of the track 22 and spring rate of the springs 108.

The tensioning mechanism 90 may reduce a variation of the tension of the track 22 during use. For instance, in some embodiments, a ratio of: (i) a variation between an average tension of a portion of the track 22 which engages the drive wheel 24 when the vehicle 10 is at rest and an average tension of the portion of the track 22 which engages the drive wheel 24 when the vehicle 10 accelerates at 2 $m/s^2$; over (ii) the average tension of the portion of the track 22 which engages the drive wheel 24 when the vehicle 10 is at rest, is no more than 30%, in some embodiments no more than 20%, in some embodiments no more than 10%, and in some embodiments even less. In some embodiments, a ratio of: (i) a variation between the average tension of the portion of the track 22 which engages the drive wheel 24 when the vehicle 10 is at rest and an average tension of the portion of the track 22 which engages the drive wheel 24 when the vehicle 10 deaccelerates at 5 $m/s^2$; over (ii) the average tension of the portion of the track 22 which engages the drive wheel 24 when the vehicle 10 is at rest, is no more than 50%, in some embodiments no more than 30%, in some embodiments no more than 20%, and in some embodiments even less.

The spring 108 may thus have a reduced spring rate. For instance, in some embodiments, a spring rate of the spring 108 is no more than 1100 lb/in, in some embodiments no more than 900 lb/in, in some embodiments no more than 700 lb/in, and in some embodiments even less. Furthermore, in some embodiments, a ratio of the spring rate of the spring 108 over a load applied on the track system 16 by the weight of the vehicle 10 at rest is no more than 0.6 $inch^{-1}$, in some embodiments no more than 0.5 $inch^{-1}$, in some embodiments no more than 0.4 $inch^{-1}$ and in some embodiments even less (e.g., no more than 0.35 $inch^{-1}$).

The track 22 may have a reduced nominal value of the tension of the track 22. For instance, in some embodiments, the nominal value of the tension of the track 22 may be no more than 7400 N, in some embodiments no more than 6400 N, in some embodiments no more than 5400 N, and in some embodiments even less, and in some embodiments, a ratio of a nominal value of the tension of the track 22 over a load applied on the track system 16 by the weight of the vehicle 10 at rest may be no more than 0.40, in some embodiments no more than 0.30, in some embodiments no more than 0.20, and in some embodiments even less.

In this embodiment, the configuration of the tensioning mechanism 90 with the tensioners 95, 105 may also facilitate packaging of the track system 16. For instance, in this embodiment, the configuration of the tensioning mechanism 90 may allow the drive/guide lugs 48 to be taller in order to allow the track system 16 to ingest debris, i.e. accumulate debris such as soil or sand, without being subject to ratcheting. For instance, in some embodiments, the track system 16 is configured to be capable of accumulating a layer of debris over the idler wheels 23, 26 of at least 15 mm of thickness, in some embodiments of at least 20 mm of thickness, in some embodiments of at least 25 mm of thickness and in some embodiments even more (e.g., at least 27 mm of thickness) without being subject to ratcheting during use. The track system 16 may also be capable of functioning when an obstacle (e.g. a rock) is inserted between the track 22 and a given one of the idler wheels 23, 26. For instance, in some embodiments, the track system 16 is able to avoid ratcheting when a cubic obstacle of at least 30 mm×30 mm, in some embodiments of at least 40 mm×40 mm, in some embodiments of at least 50 mm×50 mm, and in some embodiments of even greater dimensions, is inserted between the idler wheel 23 and the track 22.

In some embodiments, a height $H_L$ of the drive/guide lugs 48 may be at least 25 mm, in some embodiments at least 30 mm, in some embodiments at least 35 mm, in some embodiments at least 40 mm and in some embodiments even more, and a ratio of the height $H_L$ of the drive/guide lugs 48 over a thickness $T_C$ of the carcass of the track 22 from the ground-engaging outer surface 31 to the inner surface 55 of the track 22 is at least 2 mm, in some embodiments at least 3 mm, in some embodiments at least 4 mm, and in some embodiments even more.

The track system 16 may be implemented in any other suitable manner in other embodiments.

Figure 13:
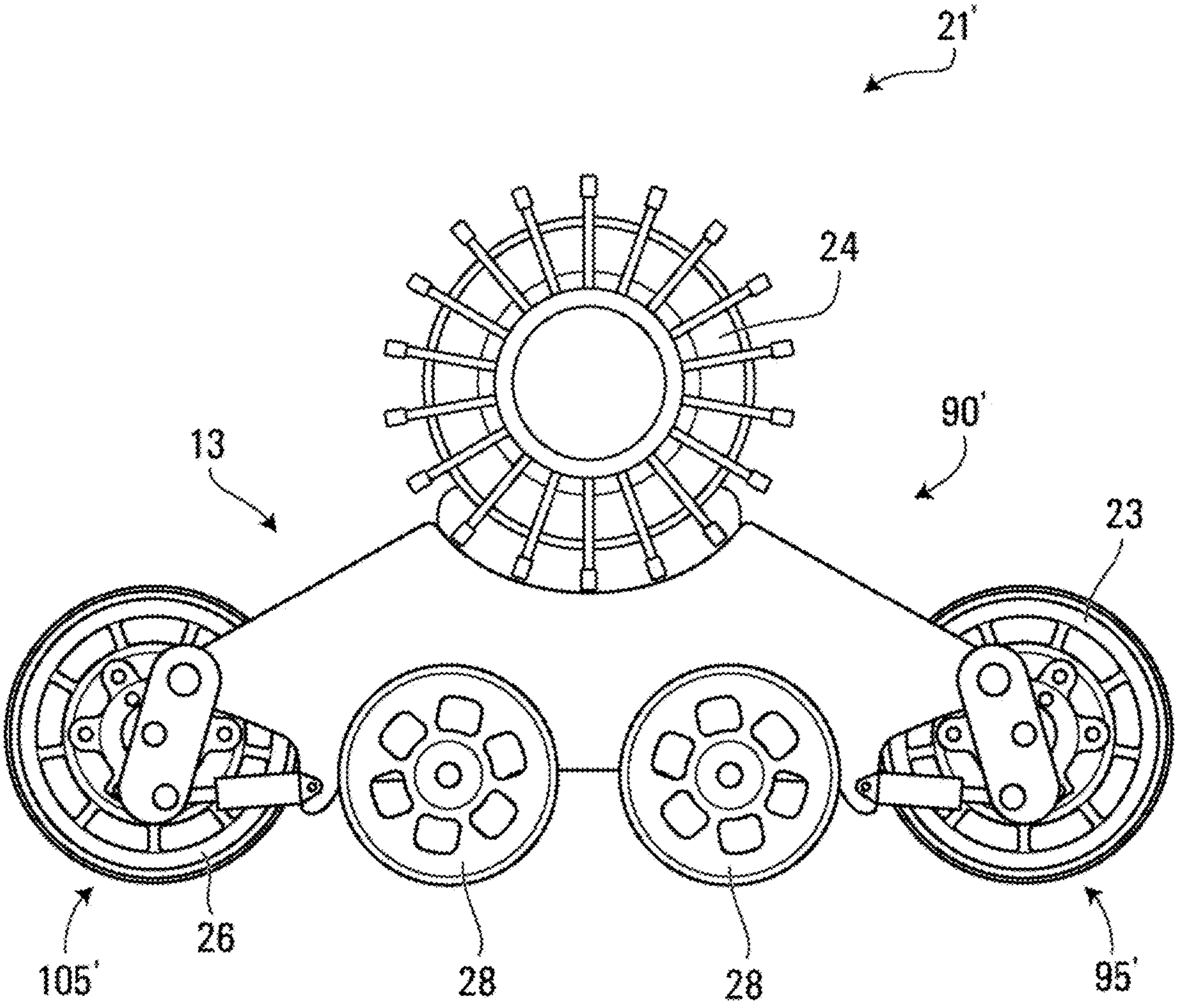
FIGS. 13 and 14 show a variant of the track-engaging assembly.
Figure 14:
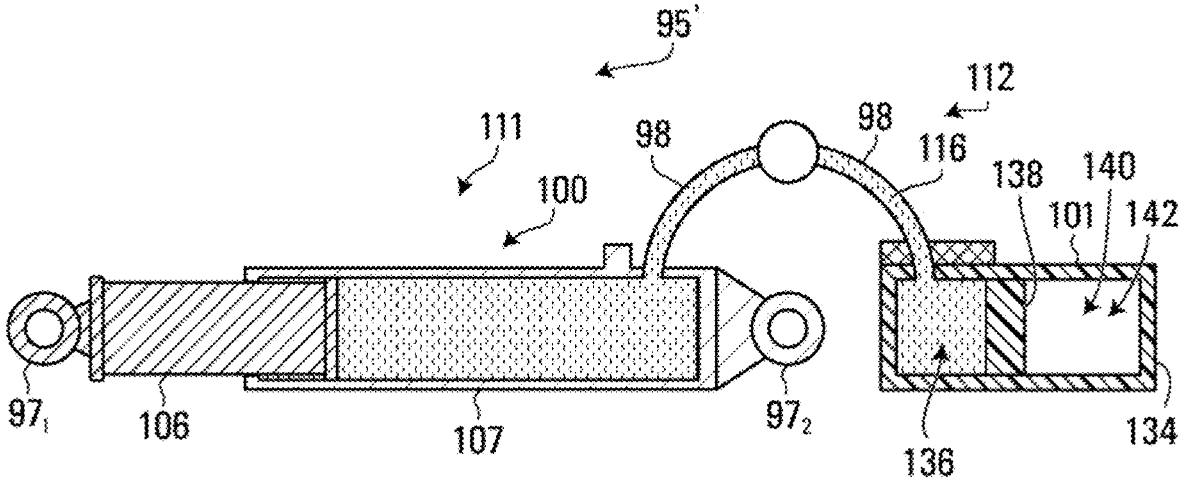

For example, in some embodiments, as shown in FIGS. 13 and 14, one of the tensioners 95',105' of a tensioning mechanism 90' for the track system 16 may comprise hydraulics and pneumatics, e.g., a hydraulic or pneumatic cylinder unit. For instance, in this embodiment, the front tensioner 95' comprises an actuator mounted at one end to the frame 13 of a track-engaging assembly 21' of the track system 16 and at another end to a hub of the front idler wheels 23. This allows the tensioner 95' to modify a distance between the front idler wheels 23 and the rear idler wheels 26 in the longitudinal direction of the track system 16, thereby affecting the tension of the track 22. More specifically, in this embodiment, the tensioner 95' is a hydraulic tensioner.

In this embodiment, the tensioner 95' comprises a first tensioning member 111 and a second tensioning member 112. More specifically, in this embodiment, the first tensioning member 111 includes a hydraulic cylinder 100 which may comprise a plurality of hydraulic cylinder elements 106, 107. A first anchor 971 of the tensioner 95' may be affixed to (e.g., by using a mechanical fastener, an adhesive, by being mechanically interlocked, etc.) or integral with (i.e., manufactured integrally with) the cylinder member 106, while a second anchor 972 may be affixed to (e.g., by using a mechanical fastener, an adhesive, by being mechanically interlocked, etc.) or integral with (i.e., manufactured integrally with) the cylinder member 107.

In this embodiment, the hydraulic cylinder elements 106, 107 are moveable relative to one another to allow the tensioner 95' to retract and/or expand. Specifically, the hydraulic cylinder elements 106, 107 may be coaxial.

In this embodiment, the hydraulic cylinder element 107 is a bore and the hydraulic cylinder element 106 is a piston moveable within its bore 107.

In this embodiment, the second tensioning member 112 comprises a hydraulic accumulator 101, which is configured to accumulate hydraulic fluid of the hydraulic cylinder 100 in an accumulation chamber 136, and which may be fluid communication with the hydraulic cylinder 100 via a channel 98. More specifically, in this embodiment, the hydraulic accumulator 101 further comprises a housing 134 comprising the accumulation chamber 136, a piston 138 moveable relative to a housing 134 and a compressible chamber 140 formed by the housing 134 and the piston 138 and which may comprise a biasing element 142 (e.g., a spring or compressible fluid) to exert a force against the piston 138. In this embodiment, the biasing element 142 is compressible fluid, which in this example is a gas (e.g., nitrogen). The housing 134 and the piston 138 may create an hermetic joint which allows the compressible chamber 140 to hermetically contain the nitrogen at a relatively high pressure such that the nitrogen exerts a force on the piston 138 that is transferred to the hydraulic cylinder 100 via the fluid flowing in the channel 98.

While in this example the front tensioner 95' comprises the actuator, in some embodiments, the rear tensioner 105' comprises the actuator and is mounted in a similar fashion but to the rear idler wheel 26. In some embodiments, both the front tensioner 95' and the rear tensioner 105' comprise an actuator, and thus both the front tensioner 95' and the rear tensioner 105' may comprise hydraulics and pneumatics, e.g., a hydraulic or pneumatic cylinder unit.

Although in the examples illustrated above the track-engaging assembly 21 comprises a single drive wheel 24, in some embodiments the track-engaging assembly 21 comprises more than one drive wheel 24, e.g., two, three, four or more drive wheels 24.

Although the agricultural vehicle 10 illustrated in FIG. 1 is an agricultural tractor comprising four track systems 16, different types of agricultural vehicles configured differently (e.g., having a different number of track systems) may implement improvements based on principles disclosed herein.

Figure 15:
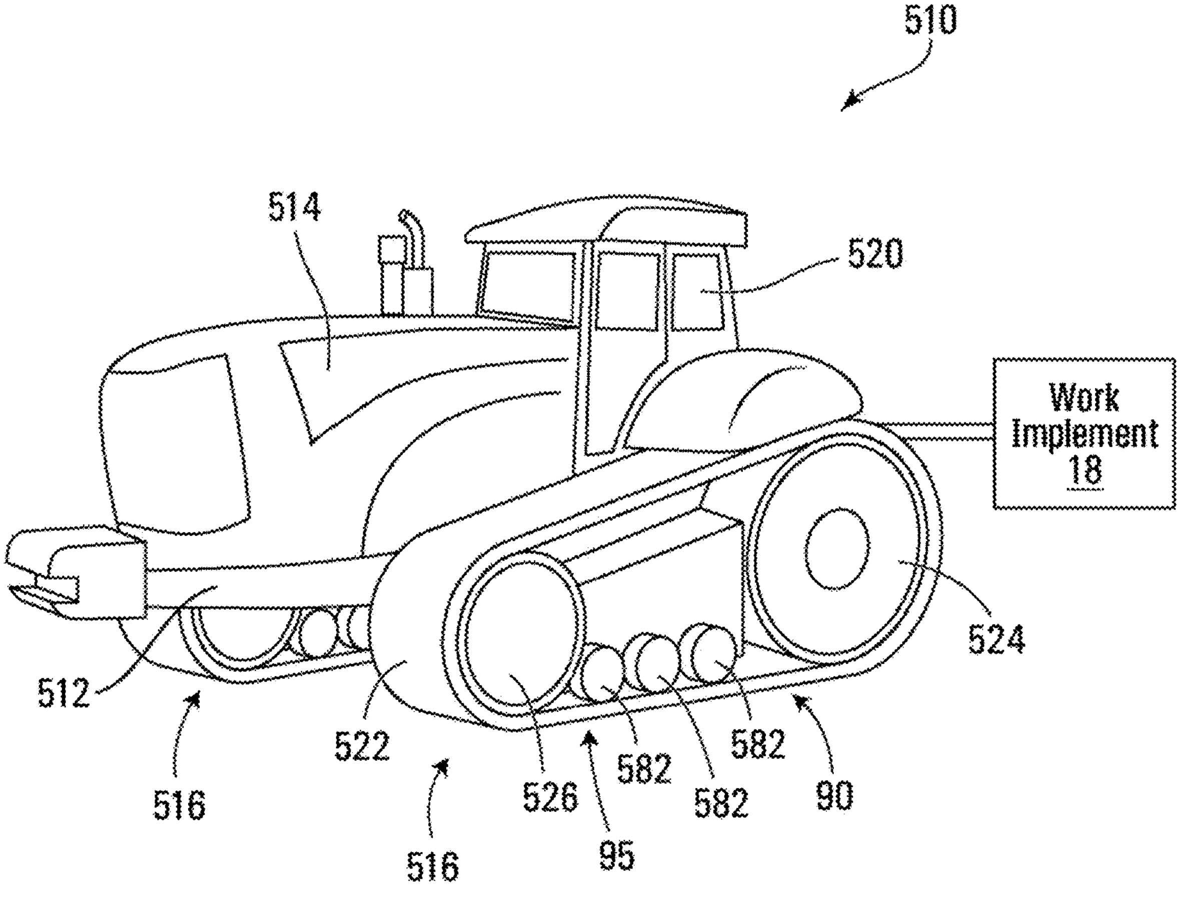
FIG. 15 shows an example of an agricultural vehicle comprising two track systems rather than four.

For instance, with additional reference to FIG. 15, an agricultural vehicle 510 may be provided comprising two track systems 516 rather than four (i.e., one track system 516 at each side of the agricultural vehicle 510). The agricultural vehicle 510 also comprises a frame 512, a prime mover 514, and an operator cabin 520 and can be equipped with the work implement 18 to perform agricultural work. Each track system 516 comprises a drive wheel 524 at a first longitudinal end portion of the track system 516, an idler wheel 526 at a second longitudinal end portion of the track system 516 opposite to the first longitudinal end portion, and a plurality of mid-rollers 528 intermediate the drive wheel 524 and the idler wheel 526. The track system 516 further comprises a track 522 disposed around the wheels 524, 526, 528 and driven by the drive wheel 524. The track system 516 may implement the tensioning mechanism 90 as described above. Additionally or alternatively, the track 522 may be configured in a manner similar to the track 22 as described above.

Figure 16:
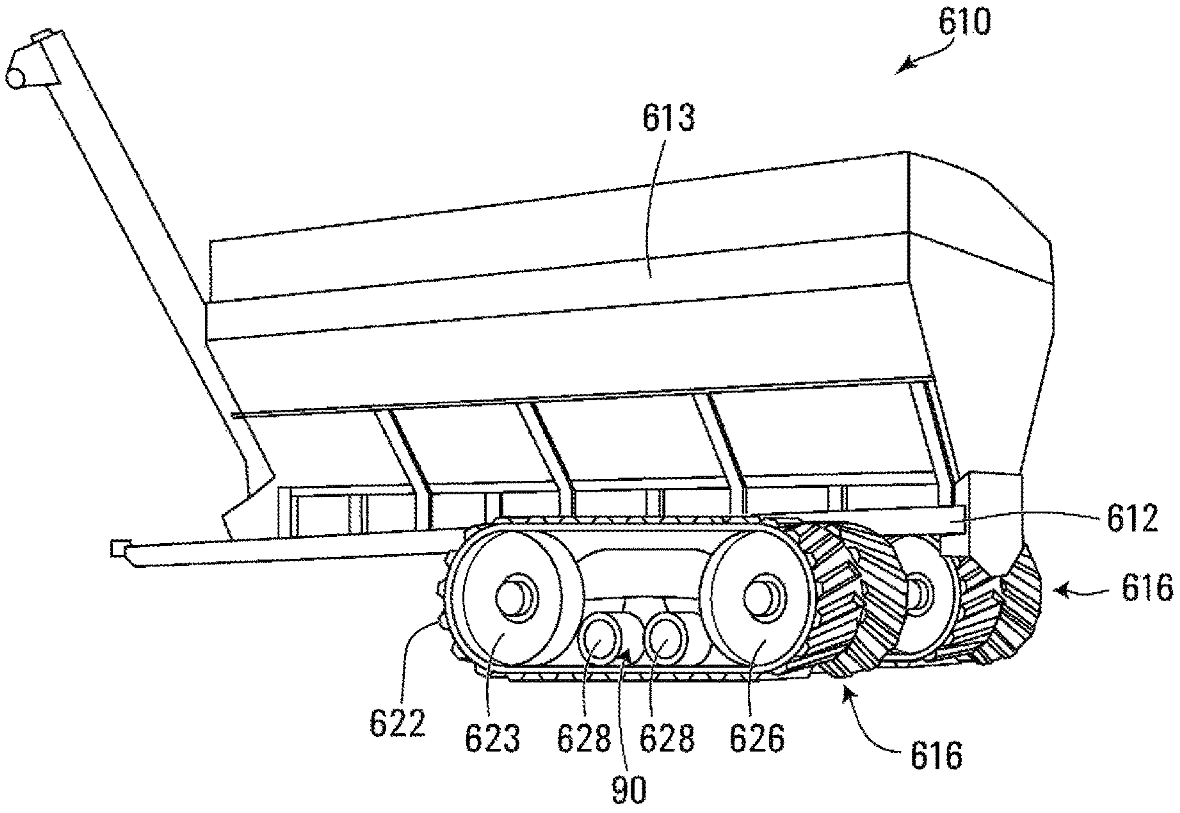
FIG. 16 shows an example of a trailed vehicle configured to be attached to the agricultural vehicle of FIG. 1 or 15.

Furthermore, the work implement 18 that is drawn by the agricultural vehicle 10 or the agricultural vehicle 510 may implement the improvements disclosed herein. For instance, with additional reference to FIG. 16, the work implement 18 may comprise a trailed vehicle 610 comprising a frame 612, a body 613 (e.g., a container) and track systems 616, 616. In this example, the trailed vehicle 610 is a harvest cart. In other examples, the trailed vehicle 610 may be a fertilizer cart, a sprayer, a planter or any other suitable type of trailed vehicle. Each track system 616 of the trailed vehicle 610 comprises front (i.e., leading) idler wheels 623 at a first longitudinal end portion of the track system 616, rear (i.e., trailing) idler wheels 626 at a second longitudinal end portion of the track system 616 opposite the first longitudinal end portion, and a plurality of mid-rollers 628 intermediate the front idler wheels 623 and the rear idler wheels 626. The track system 616 further comprises a track 622 disposed around the wheels 623, 626, 628. The track system 616 may implement the tensioning mechanism 90 as described above. Additionally or alternatively, the track 622 may be configured in a manner similar to the track 22 as described above.

In this example, the trailed vehicle 610 is not motorized in that it does not comprise a prime mover for driving the track systems 616. Rather, the trailed vehicle 610 is displaced by the agricultural vehicle 10 or the agricultural vehicle 510 to which the trailed vehicle 610 is attached. However, in some examples, the trailed vehicle 610 may be motorized. That is, the trailed vehicle 610 may comprise a prime mover for driving a drive wheel of each track system 616. For example, instead of comprising rear idler wheels 626, the track system 616 may comprise a drive wheel for driving the track 622. Also, in some examples, the trailed vehicle 610 is hybrid, i.e., has the capability of driving a drive wheel of each track system 616, but can also be on a neutral gear in order to be driven and displaced by the agricultural vehicle 10 or the agricultural vehicle 510 to which the trailed vehicle 610 is attached.

Although in embodiments considered above the vehicle 10 is an agricultural vehicle operable by a user from the operator cabin 20, in some embodiments, the vehicle 10 may be operable by a user remotely. In some embodiments, the vehicle 10 may comprise autonomy features, allowing the vehicle 10 to be semi-autonomous and/or entirely autonomous. In some embodiments, the vehicle 10 may be free of any operator cabin.

While in embodiments considered above the vehicle 10 is an agricultural vehicle, in other embodiments, the vehicle 10 may be an industrial vehicle such as a construction vehicle (e.g., a loader, a telehandler, a bulldozer, an excavator, etc.) for performing construction work or a forestry vehicle (e.g., a feller-buncher, a tree chipper, a knuckleboom loader, etc.) for performing forestry work, a military vehicle (e.g., a combat engineering vehicle (CEV), etc.) for performing military work, an all-terrain vehicle (ATV), a snowmobile, or any other vehicle operable off paved roads. Although operable off paved roads, the vehicle 10 may also be operable on paved roads in some cases.

In some examples of implementation, any feature of any embodiment described herein may be used in combination with any feature of any other embodiment described herein.

Certain additional elements that may be needed for operation of some embodiments have not been described or illustrated as they are assumed to be within the purview to of those of ordinary skill in the art. Moreover, certain embodiments may be free of, may lack and/or may function without any element that is not specifically disclosed herein.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A track system for traction of a vehicle on a ground, the track system comprising:

a track that is elastomeric and comprises a ground-engaging outer surface for engaging the ground and an inner surface opposite to the ground-engaging outer surface;

a track assembly comprising a frame supporting a plurality of track-contacting wheels configured to drive and guide the track around the track-contacting wheels, the track being configured to flex about respective ones of the track-contacting wheels; and a tensioning mechanism configured to control a tension of the track and comprising:

a first tensioner including a resilient element configured to exert a force on a front one of the track-contacting wheels; and a second tensioner including a resilient element spaced from the resilient element of the first tensioner in a longitudinal direction of the track system and configured to exert a force on a rear one of the track-contacting wheels, wherein at least one of the first and second tensioners comprises a link comprising an upper pivot rotatably connected to an upper portion of the frame, a lower pivot rotatably connected to a first end of the resilient element and a housing receiving an axle of the corresponding track-contacting wheel;

wherein the resilient element is elongated and has a second end opposite to the first end, the second end being connected to a lower portion of the frame;

wherein the resilient element is extendible in a longitudinal direction of the track system; and wherein the lower pivot of the link is leveled with or lower than the second end of the resilient element.

2. The track system of claim 1, wherein the resilient element of the first tensioner is a spring.

3. The track system of claim 2, wherein the spring of the first tensioner is a coil spring.

4. The track system of claim 2, wherein a spring rate of the spring is no more than 1100 lb/in.

5. The track system of claim 2, wherein a spring rate of the spring is no more than 900 lb/in.

6. The track system of claim 2, wherein a ratio of a spring rate of the spring over a load applied on the track system by a weight of the vehicle at rest is no more than 0.6 in−1.

7. The track system of claim 2, wherein a ratio of spring rate of the spring over a load applied on the track system by a weight of the vehicle at rest is no more than 0.5 in−1.

8. The track system of claim 1, wherein the resilient element of the second tensioner is a spring.

9. The track system of claim 8, wherein the spring of the second tensioner is a coil spring.

10. The track system of claim 1, wherein the force exerted by the first tensioner on the front one of the track-contacting wheels and the force exerted on the rear one of the track-contacting wheels are applied in opposite directions.

11. The track system of claim 1, wherein the first tensioner and the second tensioner are configured to prevent ratcheting of the track in forward and reverse directions of movement of the vehicle on the ground.

12. The track system of claim 1, wherein a nominal value of the tension of the track is no more than 7400 N.

13. The track system of claim 1, wherein a ratio of a nominal value of the tension of the track over a load applied on the track system by a weight of the vehicle at rest is no more than 0.40.

14. The track system of claim 1, wherein: the track comprises a plurality of drive/guide lugs projecting from the inner surface of the track and a plurality of traction projections projecting from the ground-engaging outer surface of the track.

15. The track system of claim 14, wherein a ratio of a height of the drive/guide lugs over a thickness of the track from the ground-engaging outer surface to the inner surface of the track is at least 2.

16. The track system of claim 1, wherein at least one of the first tensioner and the second tensioner is free of hydraulics and pneumatics.

17. The track system of claim 1, wherein the tensioning mechanism is free of hydraulics and pneumatics.

18. The track system of claim 1, wherein the housing is between the upper and lower pivots such that an extension of the resilient element pushes the axle of the corresponding track-contacting wheel away from the frame, and inversely a compression of the resilient element pulls the axle of the corresponding track-contacting wheel towards the frame.

* * * * *